United States Patent [19]

Makita et al.

[11] Patent Number: 4,949,226
[45] Date of Patent: Aug. 14, 1990

[54] PROJECTOR-TYPE LIGHTING DEVICE OF EXPANDED OUTLINE APPEARANCE FOR USE AS A VEHICULAR HEADLAMP OR THE LIKE

[75] Inventors: Hiroyuki Makita; Takahisa Shinoda; Yasuaki Nakamura; Osamu Endoh, all of Shizuoka, Japan

[73] Assignee: Koito Seisakusko Co., Ltd., Tokyo, Japan

[21] Appl. No.: 369,995

[22] Filed: Jun. 23, 1989

[30] Foreign Application Priority Data

Jun. 24, 1988 [JP] Japan .............................. 63-83475[U]
Jan. 17, 1989 [JP] Japan ...................................... 1-5969
Jan. 19, 1989 [JP] Japan ..................................... 1-10495

[51] Int. Cl.$^5$ ............................................. B60Q 1/00
[52] U.S. Cl. ...................................... 362/61; 362/80; 362/247
[58] Field of Search ................... 362/61, 80, 240, 241, 362/247

[56] References Cited

U.S. PATENT DOCUMENTS

| | | | |
|---|---|---|---|
| 4,503,488 | 3/1985 | Soules | 362/247 |
| 4,680,680 | 2/1987 | Iwaki | 362/80 |
| 4,814,950 | 3/1989 | Nakata | 362/61 |
| 4,849,861 | 7/1989 | Arima | 362/61 |
| 4,895,693 | 1/1990 | Suzuki et al. | |

FOREIGN PATENT DOCUMENTS

| | | | |
|---|---|---|---|
| 2612854 | 9/1988 | France | 362/267 |
| 5880 | 1/1978 | Japan | 362/297 |

*Primary Examiner*—Douglas Hart
*Attorney, Agent, or Firm*—Browdy and Neimark

[57] ABSTRACT

A vehicle headlamp having a projector-type light source assembly capable of emitting a highly coherent light beam. In order to make the headlamp appear larger than the light source assembly, a lamp housing is provided which is much larger in size than the light source assembly mounted therein, with the consequent provision of an annular space around the light source assembly within the lamp housing. Disposed in this annular space is an outline expander plate of transparent material having a multiplicity of minute cavities of cone shape formed in its rear face. The outline expander plate transmits by internal total reflection the light incident edgewise thereon. While so traveling through the outline expander plate, the light is reflected by the surfaces of the conical cavities generally in the forward direction of the headlamp, thereby making the complete surface area of the headlamp appear glowing. The light needed for illuminating the outline expander plate may be supplied either by the projector-type light source assembly or by separate light sources.

15 Claims, 11 Drawing Sheets

PROJECTOR-TYPE LIGHTING DEVICE OF EXPANDED OUTLINE APPEARANCE FOR USE AS A VEHICULAR HEADLAMP OR THE LIKE

BACKGROUND OF THE INVENTION

This invention relates generally to lighting devices, and particularly to a projector-type lighting device suitable for use as a vehicular headlamp or the like.

The projector-type headlamp has been known which comprises a light bulb and a reflector for reflecting and converging the light from the bulb. Also included is a plano-convex projection lens having a focus in the vicinity of a point or line of convergence of the reflected light. When the light bulb is lit up, the headlamp projects a coherent light beam of very sharply delineated outline. The projector-type lamp is well suited for vehicular headlamp applications by virtue of its capability of meeting the most stringent beam pattern standards.

A drawback has existed with the prior art projector-type headlamp, however. The current trend in the design of vehicle headlamps is toward larger size, particularly a greater horizontal dimension in comparison with a vertical dimension. Automobile designers have objected to the projector-type headlamp by reasons of its compactness and the round shape of the projection lens.

In order to overcome this weakness, it has been suggested to install a projector-type light source assembly, comprised of a light bulb, a reflector and a projection lens, within a lamp housing or body of much larger size and esthetically appearing shape. An annular reflector is mounted in the space left within the lamp housing by the light source assembly. The light source assembly projects a light beam through the central aperture in the annular reflector in the nighttime. In the daytime, as the reflector reflects the daylight, the headlamp appears much larger than the projector-type light source assembly, the latter being practically invisible.

This known solution is objectionable because the reflector is mostly invisible in the nighttime. Only the projector-type light source assembly appears bright. Consequently, as the car with a pair of such headlamps travels, it may hallucinate the pedestrians and the drivers of the meeting and preceding vehicles into the wrong perception that two motorcycles are running side by side. The wrong perception may invite wrong traffic decisions by the pedestrians and the drivers, possibly resulting in traffic accidents in the worst case.

SUMMARY OF THE INVENTION

The present invention defeats the noted difficulties encountered with the prior art projector-type lighting device particularly when it is used as a vehicular headlamp or for similar applications. More specifically, the invention provides an improved projector-type lighting device that appears much larger in size, or in more esthetically favorable shape, than the projection lens in use.

Briefly, the improved projector-type lighting device of the invention may be summarized as comprising projector-type light source means disposed at least in part within a lamp housing of desired shape and size approximately in a central position on the latter. The projector-type light source means comprises a light source, a reflector for reflecting and converging the light from the light source, and a projection lens disposed opposite the light source and having a focus at a point intermediate the projection lens and the light source for projecting a light beam through the lamp housing. The projector-type light source means is so small in comparison with the lamp housing that an annular space is left around the light source means within the lamp housing. The lighting device further comprises outline expansion means disposed in the annular space between the projector-type light source means and the lamp housing. The outline expansion means is capable of self-illumination in order to make the lighting device appear larger than when only the projector-type light source means is glowing.

In one preferred embodiment of the invention, the outline expansion means comprises an outline expander plate of transparent material, such as a plastic, which is centrally apertured to permit the passage of the light beam emitted by the projector-type light source means. The outline expander plate is molded integral with a multiplicity of conical cavities formed in its rear face for reflecting light incident edgewise thereon. This light for illuminating the outline expander plate may be supplied as by a pair of light bulbs positioned opposite a pair of opposite edges of the outline expander plate.

The pair of light bulbs may be lit up at dusk or in the nighttime. Diffusely traveling through the outline expander plate by internal total reflection, the light rays on impinging upon the surfaces of the conical cavities are thereby reflected generally in the forward direction of the lighting device. The glowing outline expander plate makes substantially the full size of the lighting device appear luminous regardless of whether the projector-type light source means is lit or unlit. Therefore, when a pair of such lighting devices are used as headlamps on a motor vehicle, there is practically no danger of their being erroneously perceived as the headlamps of two different motorcycles or the like traveling side by side.

In an alternative embodiment of the invention, the outline expander plate has no dedicated light source means but has its inside edge held against the projection lens of the projector-type light source means. Thus the outline expander plate utilizes part of the light being projected by the projector-type light source means for self-illumination. This scheme is preferred because of the simpler construction.

The invention also teaches to provide a half-silvered mirror within the lamp housing and forwardly of the outline expansion means. The half-silvered mirror glows by being illuminated by the outline expansion means in the nighttime, and by reflecting daylight in the daytime.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

General

The invention will now be described more specifically as embodied in the vehicle headlamp generally designated 10 in FIGS. 1-3. The exemplified headlamp 10 has a lamp housing 12 of generally rectangular shape as seen in a front view as in FIG. 1. Mounted to the lamp housing 12 in a central position thereon and partly received therein is a projector-type light source assembly 14, FIGS. 2 and 3, for emitting a light beam of desired pattern. It will be seen that the projector-type light source assembly 14 is much less in size, both vertically as seen in FIG. 2 and horizontally as in FIG. 3, than the lamp housing 12. An annular space is therefore left around the projector-type light source assembly 14 within the lamp housing 12.

Figure 2:
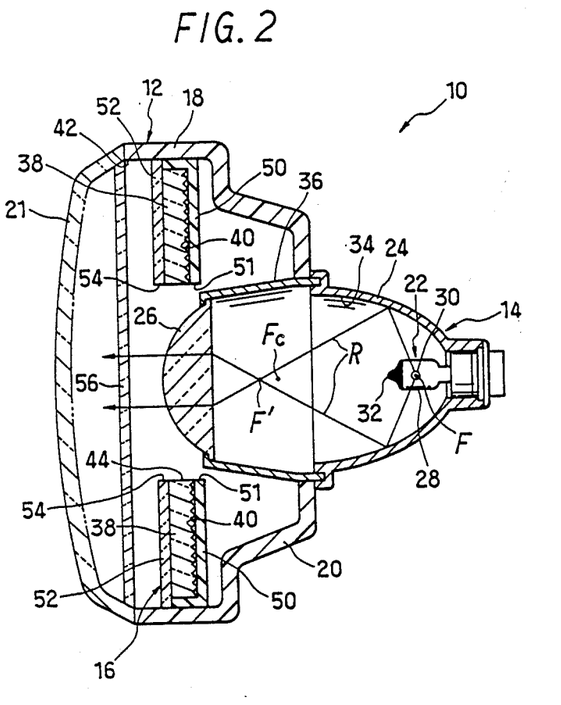
FIG. 2 is a vertical section through the headlamp of FIG. 1, taken along the line II—II therein.
Figure 3:
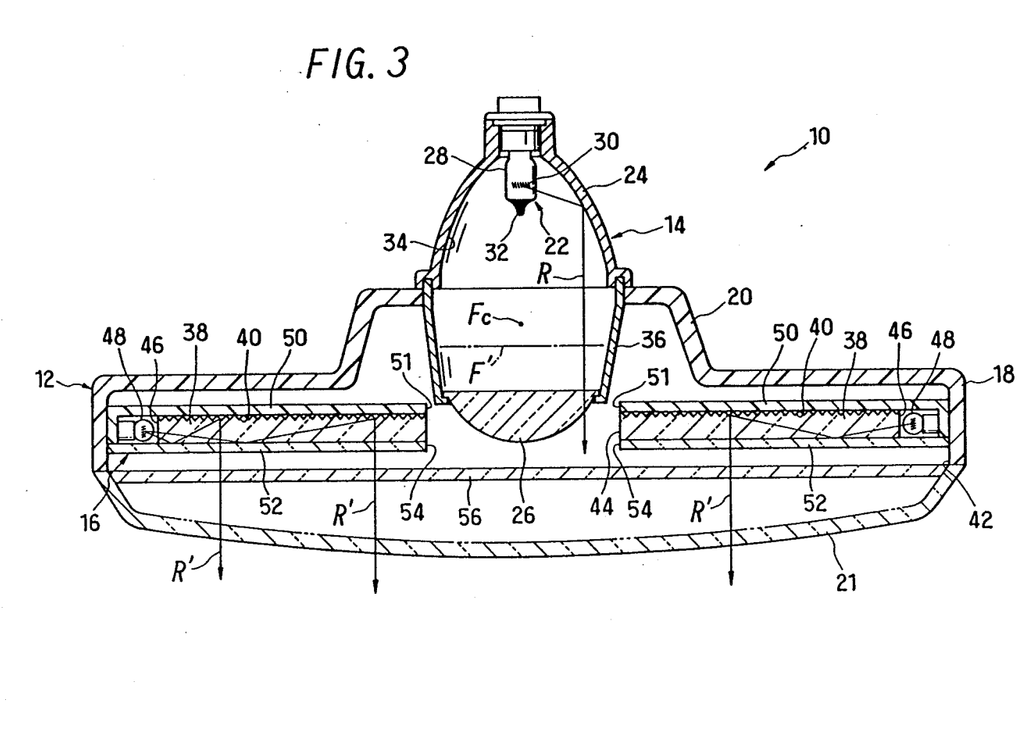
FIG. 3 is a horizontal section through the headlamp of FIG. 1, taken along the line III—III therein.

FIGS. 2 and 3 also reveal outline expansion means 16 disposed in the annular space between the lamp housing 12 and the projector-type light source assembly 14 in accordance with a feature of the invention. The outline expansion means 16 are capable of self-illumination. The size and shape of the outline expansion means 16 as seen in a front view approximately correspond to those of the lamp housing 12. Therefore, when the outline expansion means 16 are glowing, either by self-illumination or by reflection of the daylight, the headlamp 10 appears luminous substantially throughout its full vertical and horizontal dimensions.

The following is a more detailed discussion of the lamp housing 12, the projector-type light source assembly 14, and the outline expansion means 16, in that order and under separate headings. The description of operation and advantages will follow the discussion of the listed headlamp components.

Lamp Housing

Figure 1:
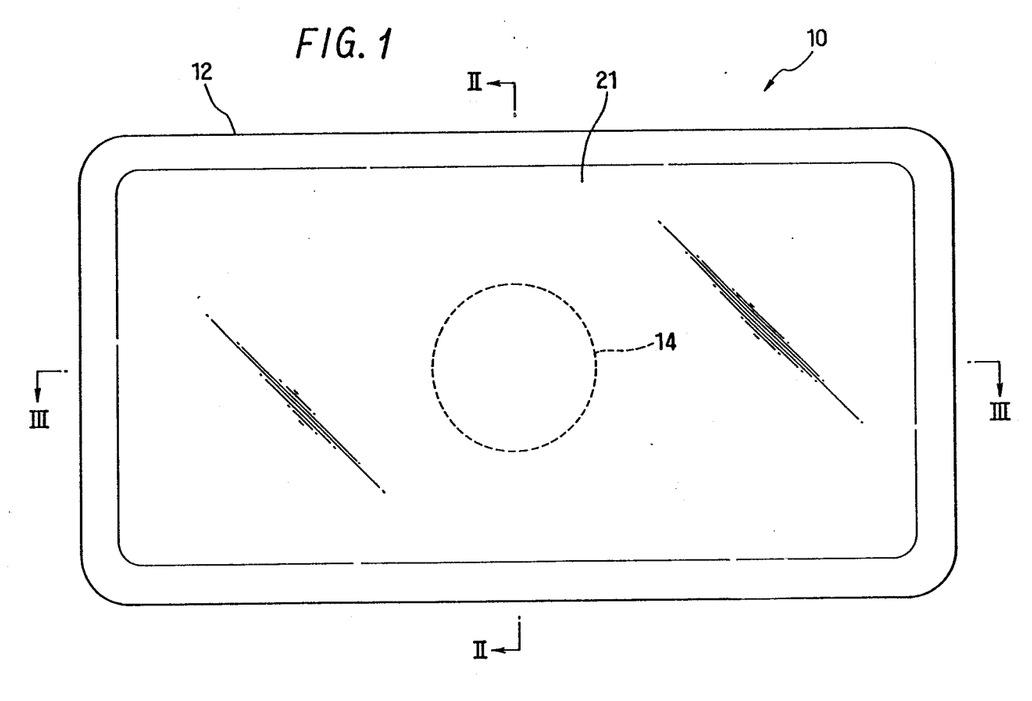
FIG. 1 is a front elevation of projector-type vehicle headlamp to which the present invention finds application.

As will be understood from FIGS. 1-3, the lamp housing 12 has a lamp body 18 of rigid plastic or like material and of generally rectangular, horizontally elongated shape as seen in a front view as in FIG. 1. The lamp body 18 has a closed rear side, shown directed to the right in FIG. 2, and an open front side. The rear side of the lamp body 18 is formed to include a rearward protuberance or recess 20 positioned centrally thereon for mounting the projector-type light source assembly 14. The open front side of the lamp body 18 is closed by a front cover or control lens 21 of vitreous material.

Projector-Type Light Source Assembly

Figure 4:
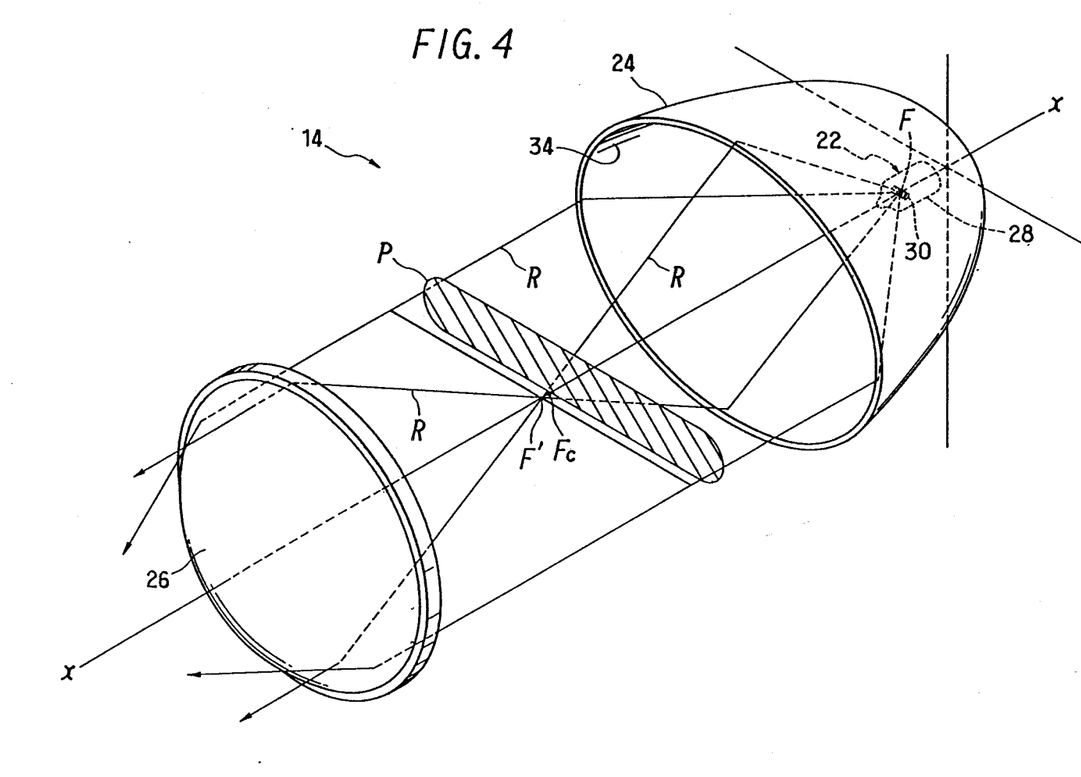
FIG. 4 is a enlarged, schematic perspective view of the projector-type light source assembly used in the headlamp of FIG. 1.

The projector-type light source assembly 14 appears in FIGS. 2 and 3 and in greater detail in FIG. 4. It comprises a light source shown as a bulb 22, a reflector 24 having the bulb mounted centrally therein for reflecting and converging the light emitted by the bulb 23, and a plano-convex projection lens 26 disposed forwardly of the reflector for projecting the reflected light forwardly through the control lens 2 of the lamp housing 12.

The light bulb 22 has an envelop 28 of suitable high-temperature vitreous material containing a filament 30. This filament is disposed at the focus F of the reflector 24. The reflector focus F will be defined subsequently. A light shield coating 32 at the front tip of the envelop 28 serves to shield the light rays from the filament 30 against direct forward irradiation.

The reflector 24, with a reflective surface 34, is herein shown as being of the combined paraboloidal-elliptical type. By the paraboloidal-elliptical reflector is meant the reflector that is paraboloidal in horizontal section as in FIG. 3 and elliptic in vertical section as in FIG. 2. Further the focus of the paraboloid and the first focus of the ellipse are at the same point F on a common optical axis x—x. This common point is hereby defined as the aforesaid focus F of the reflector 24.

Accordingly, with the filament 30 of the light bulb 22 positioned at the reflector focus F, the light rays R emitted by the light bulb become parallel to the optical axis x—x in a horizontal direction on reflection from the reflector 24, as illustrated in FIG. 3. In a vertical direction, on the other hand, the light rays R converge at the second focus of the ellipse in which the reflector 24 is shaped vertically, as indicated in FIG. 2. Consequently, as will be understood from FIG. 4, the light rays R converge at and along a horizontal line F that right-angularly crosses the optical axis x—x at the second focus of the ellipse. It will therefore be seen that, taken in a vertical plane at right angles with the optical axis x—x and just forwardly or rearwardly of the line of convergence F, the beam of reflected light rays R has a horizontally elongated, rectangular shape, as indicated by the hatching and designated F in FIG. 4.

Despite the showings of FIGS. 2-4, it is not desired that the reflector 24 of the projector-type light source assembly 14 be limited to the combined paraboloidal-elliptic configuration. Any other suitable type of reflector may be employed depending upon the desired beam pattern. Examples are a paraboloid of revolution and a deformed ellipse.

The projection lens 26 of the projector-type light source assembly 14 takes the form of a plano-convex lens, with the convex side directed forwardly of the headlamp 10. Positioned forwardly of the reflector 24, the projection lens 26 has a focus Pc somewhat rearwardly of the line of convergence F of the reflector. Therefore, the projection lens 26 throws the reflected light rays R forwardly of the headlamp 10 with the beam pattern P inverted. A lens holder tube 36 is secured endwise to the periphery of the reflector 24 and firmly holds the projection lens 26 on the other end. Thus the projection lens 26 is supported in position with respect to the reflector 24.

Outline Expansion Means

Figure 5:
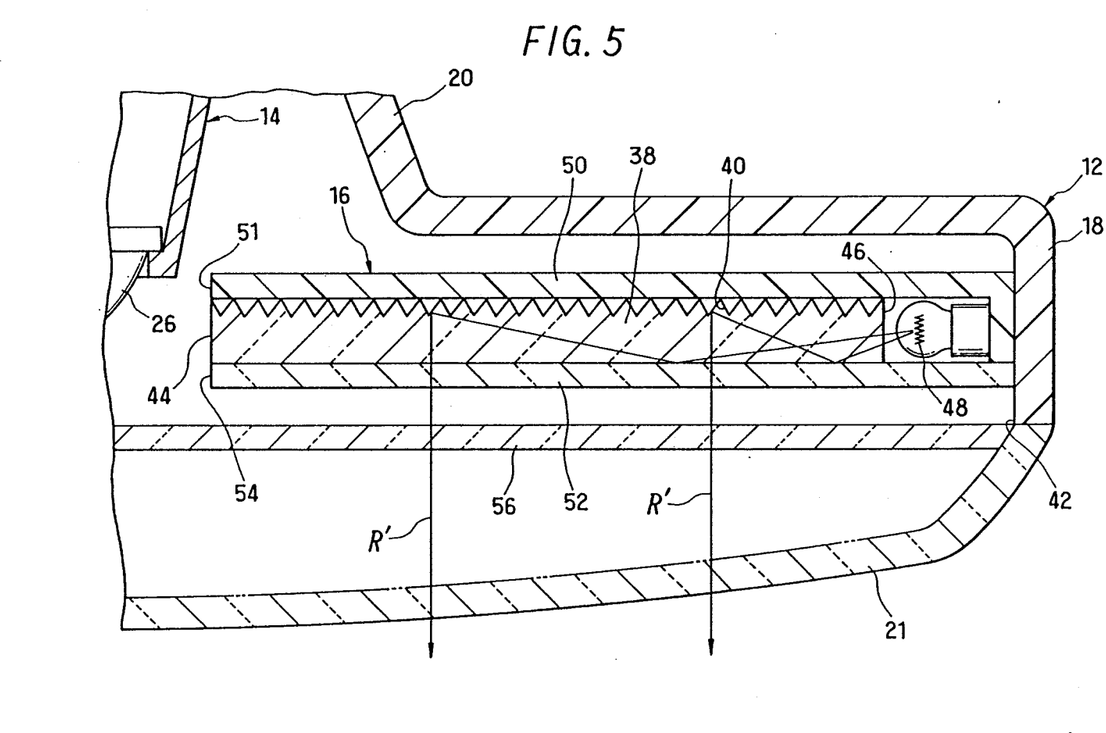
FIG. 5 is an enlarged, fragmentary horizontal section through the headlamp of FIG. 1, also taken along the line II—II therein and showing the outline expansion means in more detail for the discussion of its operation.

As illustrated in FIGS. 2 and 3 and on an enlarged scale in FIG. 5, the outline expansion means 16 include an outline expander plate 38 of transparent material, typically a plastic, complete with a multiplicity of conical cavities 40 forced in its rear face directed away from the control lens 21. The outline expander plate 38 is shaped and sized to substantially completely close the front opening 42 of the lamp body 18. A central aperture 44 in the outline expander plate 38 receives part of the projection lens 26 of the light source assembly 14 with clearance, permitting the same to project the light beam through the aperture.

FIGS. 3 and 5 show a pair of opposite edges 46 of the outline expander plate 36 in a horizontal direction. Disposed opposite these edges 46 of the outline expander plate 38 are a pair of light bulbs 48 for irradiating the same. The light rays from the bulbs 48 are reflected by the surfaces of the conical cavities 40 in the outline expander plate 38 and thereby to be thrown generally forwardly of the headlamp 10, as indicated at R in FIGS. 3 and 5.

The outline expander plate 38 is supported by a generally flat holder 50 secured to the lamp body 18. This holder 50 is also centrally apertured at 51, in register with the aperture 44 in the outline expander plate 38 for exposing the projector-type light source assembly 14.

As an incidental feature of the invention, a diffuser plate 52 is disposed forwardly of the outline expander plate 38 with a view to the uniformity of the light reflected by the outline expander plate. The diffuser plate 52 is also centrally apertured at 54 for exposing the projector-type light source assembly 14.

Seen at 56 in FIGS. 2, 3 and 5 is a filter plate constituting another optional feature of the invention. The filter plate 56 closes the complete front opening 42 of the lamp body 18. The filter plate 56 may be suitably colored. For example, it may be colored yellow for use of this lighting device as a fog lamp. Alternatively, the central portion of the filter plate 56 may be colorless and transparent, and the remaining portion may be colored. A metallic color may also be employed. When the light bulbs 48 of the outline expansion means 16 are lit up at dusk, the complete surface of the front lens 21 will give off a dim light, making the lamp very attractive esthetically.

An additional possible modification of the headlamp 10 is the provision of a half-silvered mirror film on the front lens 21. Such a mirror may be employed either in substitution for, or in combination with, the filter plate 56.

Operation

The pair of light bulbs 48 of the outline expansion means 16 may be lit up together with the bulb 22 of the projector-type light source assembly 14 at dusk or in the nighttime. The light rays from the bulbs 48 will enter the outline expander plate 38 through its opposite edges 46 and travel throughout the plate by internal total reflection, as indicated by the arrow headed lines designated R in FIGS. 3 and 5. While so traveling through the outline expander plate 38, the light rays R will partly impinge on the surfaces of the conical cavities 40 in its rear face. The light rays R will be reflected by such surfaces generally forwardly of the headlamp 10 through the diffuser plate 52, filter plate 56 and front cover or lens 21.

Thus, with the complete outline expander plate 38 glowing, substantially the full horizontal and vertical dimensions of the headlamp 10 will become visible to the pedestrians and the drivers of the meeting or preceding vehicles, even though it is only the projector-type light source assembly 14 of far smaller size that is throwing a light beam for road illumination. The pedestrians and drivers will readily recognize the headlamp 10 as being that of a four-wheeled motor vehicle rather than of a two-wheeled vehicle.

Even when the light bulbs 48 are unlit as at dusk, the outline expander plate 38 will glow when irradiated as by the headlamp beams of approaching vehicles. The headlamp 10 will then be more readily recognized as such.

Optionally, the filter plate 56 may be employed to make the outline expander plate 38 to glow in any color chosen from utilitarian or esthetic considerations. It may also be contemplated to make variable the intensity of illumination of the outline expander plate 38.

It is to be understood that the conical cavities 40 in the outline expander plate 38 do not represent the sole means of reflecting the light from the bulbs 48. Such cavities may be replaced by grooves, by a reflective film or layer, or by any means capable of similarly reflecting light from its source or sources apart from the projector-type light source assembly 14.

Second Form

Figure 6:
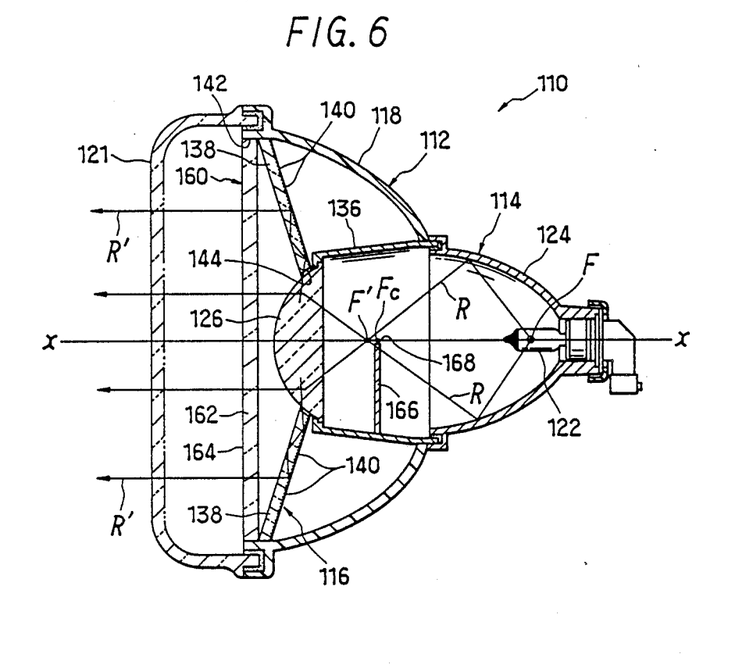
FIG. 6 is a view similar to FIG. 2 but showing another preferred form of projector-type headlamp according to the invention.
Figure 7:
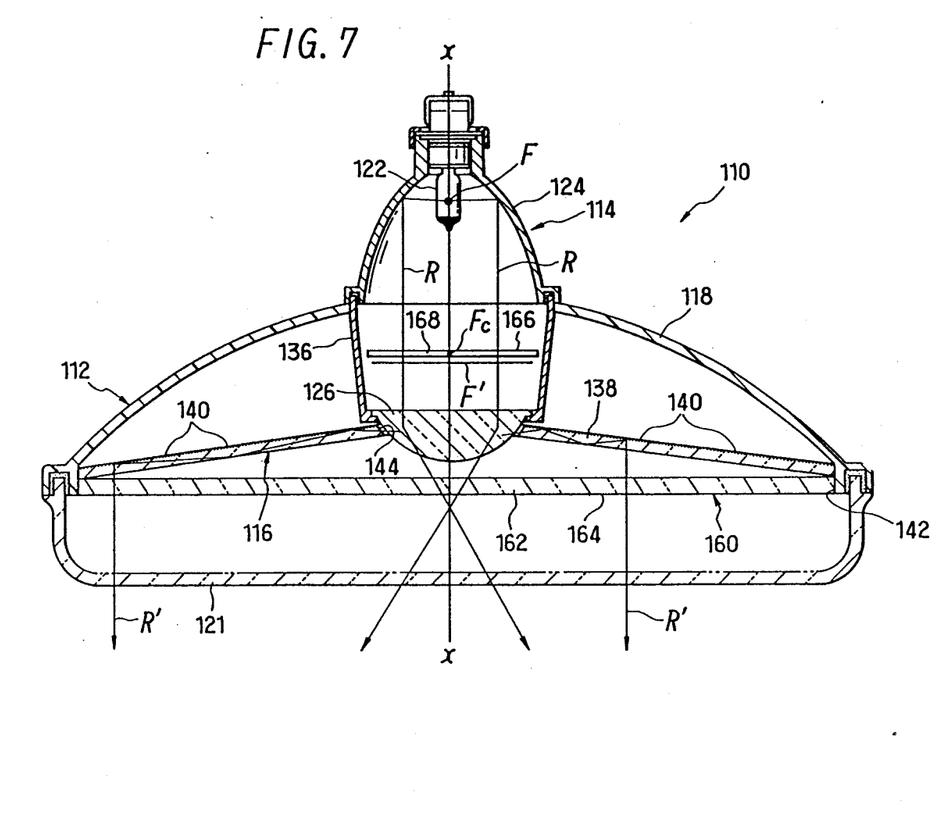
FIG. 7 is a horizontal section through the headlamp of FIG. 6.

FIGS. 6 and 7 show a second preferred form of headlamp according to the invention. The various parts of this alternative headlamp will be indicated by the same reference numerals as used to denote the corresponding parts of the FIGS. 1-5 headlamp 10, only with the digit "1" prefixed to such numerals.

The second headlamp 110 features modified outline expansion means 116 which differs from the outline expansion means 16 of the FIGS. 1-5 headlamp 10 in having no devoted light source means. Instead, the outline expansion means 116 utilizes the light emitted by a projector-type light source assembly 114 for self-illumination.

The primary component of the outline expansion means 116 is an outline expander plate 138 shaped and sized to conform to the shape and size of the front opening 142 of a lamp body 118. The lamp body 118 makes up a lamp housing 112 in combination with a front cover or control lens 121. The outline expander plate 138 is mounted in position by having its periphery secured to the front inside edge of the lamp body 118, instead of by being supported by the holder 50 as in the preceding embodiment. Also, in this alternative embodiment, the outline expander plate 138 is not exactly planar but is slightly convexed rearwardly.

An aperture 144 of circular shape is defined centrally in the outline expander plate 138. The inside edge of the outline expander plate 138, bounding the aperture 144, is held opposite a peripheral part of the front, convex side of a plano-convex projection lens 126 of the projector-type light source assembly 114. Thus the light required for illuminating the outline expander plate 138 is supplied by the projector-type light source assembly 114. The outline expander plate 138 has a multiplicity of conical cavities 140 formed in its rear face for reflecting the light from the light source assembly 114.

As required or desired, the noted peripheral port of the convex side of the projection lens 126 may be suitably knurled in order that a greater amount of light may be supplied to the outline expander plate 138. Also, the surface of the inside edge of the outline expander plate 138 may be either concaved or laid normal to the traveling direction of the light issuing from the peripheral part of the convex side of projection lens 126, in order to better receive the light from the projection lens.

Preferably, and as shown, a half-silvered mirror 160 is mounted within the lamp housing 112 just forwardly of the outline expander plate 138. The half-silvered mirror 160 comprises a flat carrier plate 162 of transparent material carrying a metallic film 164 on its front face. The metallic film 164 has a thickness such that approximately half the light falling thereon at normal incidence is reflected, the other half being transmitted.

The projector-type light source assembly 114 is also slightly different in construction from its counterpart of the FIGS. 1-5 headlamp 10. The difference consists principally in a shield screen 166 rigidly supported upstandingly within a lens holder tube 136. With its top edge 168 disposed at the focus Pc of the projection lens 126, the shield screen 166 functions to cut off the bottom half of the beam being converged by the reflector 124. Since the beam pattern is subsequently inverted by the projection lens 126, the beam of light projected by this headlamp 110 is virtually free from the unnecessary upward component.

The headlamp 110 is analogous with the FIGS. 1-5 headlamp 10 in the other details of construction.

Operation of Second Form

The headlamp 110 conventionally projects a beam of light R when the bulb 122 of the projector-type light source assembly 114 is lit up. The outline expansion means 116 of this embodiment is based on the fact that the projection lens 126 emits a substantial amount of light more or less in its lateral direction. This lateral component of the light beam is utilized for illuminating the outline expander plate 138. As such lateral light component enters the outline expander plate 138 from its inside edge and travels therethrough by internal total reflection, the surfaces of the conical cavities 140 in its rear face reflect the light generally forwardly of the headlamp 110, as indicated at R. Thus, as the outline expander plate 138 glows, the complete area of the headlamp 110 appears glowing.

In the daytime, too, the half-silvered mirror 160 will reflect the daylight, so that the complete area of the headlamp 110 will appear glowing. A similar half-silvered mirror could of course be employed in the FIGS. 1-5 headlamp 10.

Third Form

Figure 8:
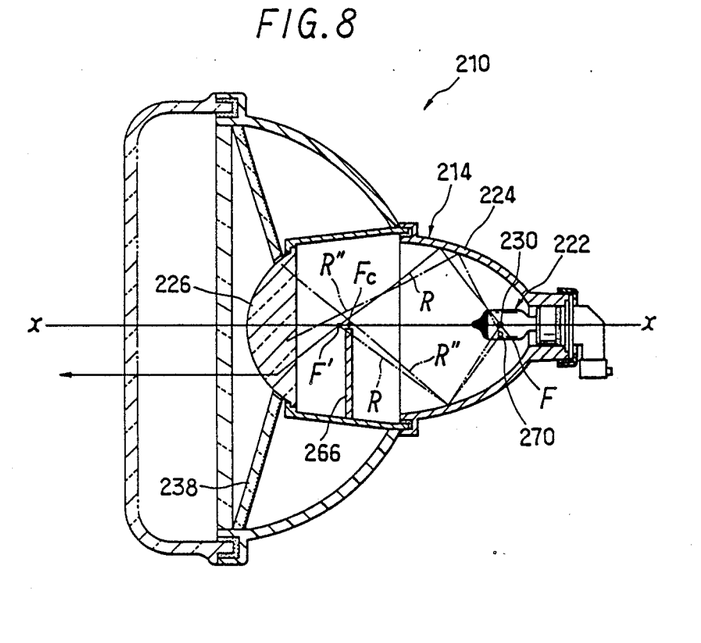
FIG. 8 is also a view similar to FIG. 2 but showing still another preferred form of projector-type headlamp according to the invention.

The headlamp 210 shown in FIG. 8 represents an adaptation of the FIGS. 6 and 7 headlamp 110 for use as clearance lamp as well. The headlamp 210 features an electric bulb 222, included in a projector-type light source assembly 214, that has a second filament 270 in addition to the first filament 230 corresponding to the filament 30 of the FIGS. 1-5 headlamp 10. The second filament 270 is to glow in use of the headlamp 210 as clearance lamp, so that the intensity of the light produced by this second filament can be considerably less than that emitted by the first filament 230.

An inspection of FIG. 8 will also reveal that the second filament 270 is disposed below the focus F of the reflector 224 of the light source assembly 214. The first filament 230 is at the reflector focus F as in the foregoing embodiments. The other details of construction of this lighting device 210 are identical with those of the FIG. 6 and 7 device 110.

Operation of Third Form

With the second filament 270 disposed below the focus F of the reflector 224, the light rays R emitted thereby are hardly cut off by the shield screen 266. Therefore, despite the reduced intensity of the light emitted by the second filament 270 itself, a sufficient amount of light is supplied from the peripheral part of the projection lens 226 to the outline expander plate 238, causing the latter to flow uniformly throughout its entire area. The uniformly glowing outline expander plate 238 makes it possible for this lighting device 210 to perform the additional functing of clearance lamp. Of course, the device 210 functions as headlamp when the first filament 230 is switched on.

Fourth Form

Figure 9:
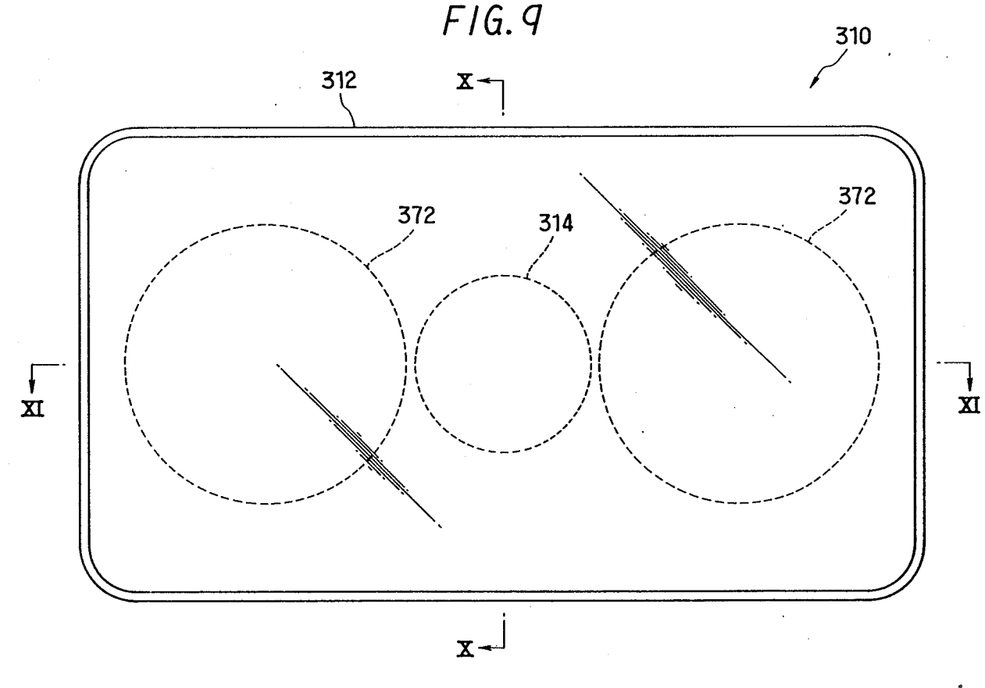
FIG. 9 is a front elevation of a further preferred form of projector-type headlamp according to the invention.
Figure 10:
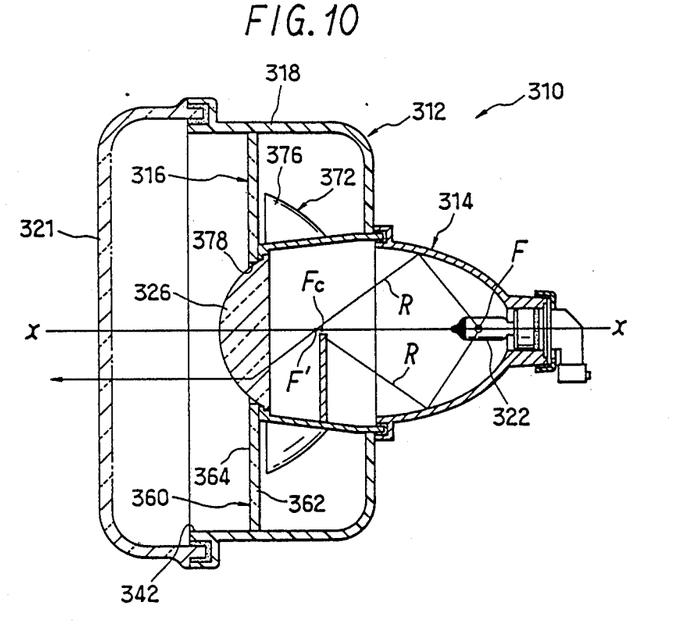
FIG. 10 is a vertical section through the headlamp of FIG. 9, taken along the line X—X therein.
Figure 11:
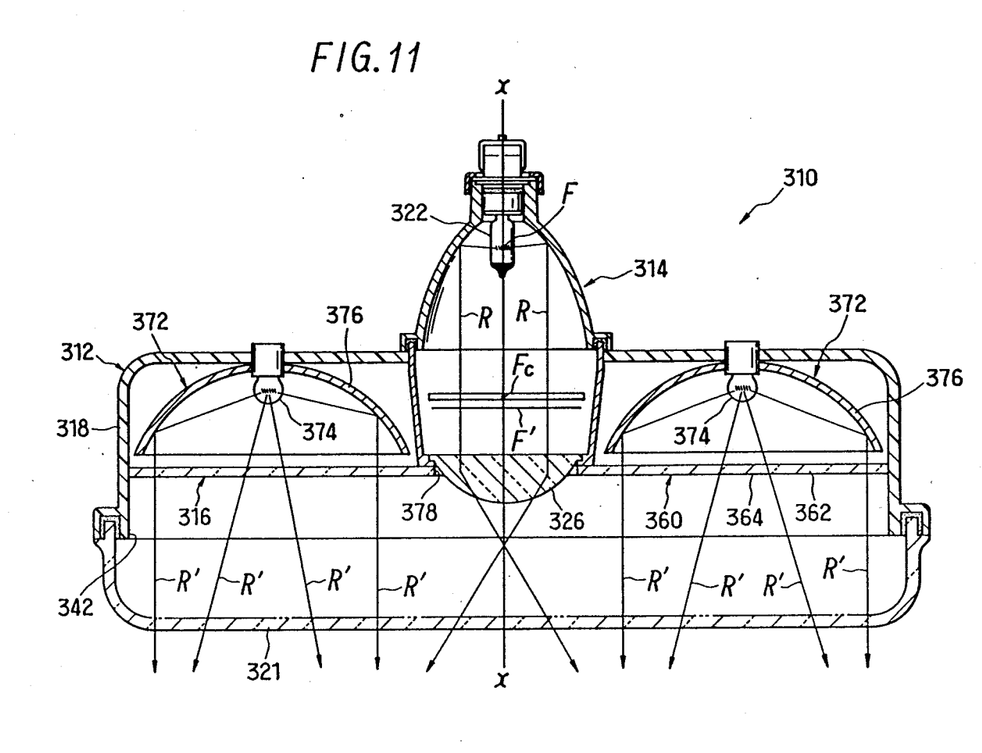
FIG. 11 is a horizontal section through the headlamp of FIG. 9, taken along the line XI—XI therein.

FIGS. 9-11 illustrate a further preferred form of headlamp 310 featuring modified outline expansion means 316. The outline expansion means 316 comprises a pair of outline expansion light source assemblies 372 juxtaposed horizontally on both sides of a projector-type light source assembly 314 within a lamp housing 312, and a half-silvered mirror 360 positioned in front of the outline expansion light source assemblies 372 and closing the front opening 342 of the mirror body 318. The projector-type light source assembly 314 is shown to be of the same construction as its counterpart 114 of the FIGS. 6 and 7 headlamp 110.

The pair of outline expansion light source assemblies 372 are alike in construction each comprising a light bulb 374 and a generally concave reflector 376 having the bulb 374 mounted centrally thereto.

The half-silvered mirror 360 can also be of the same construction as its counterpart 160 of the FIGS. 6 and 7 headlamp 110. Thus the half-silvered mirror 360 comprises a carrier plate 362 of a transparent plastic or like material, and a metallic film 364 on the front face of the carrier plate 362. Unlike the half-silvered mirror 160 of the FIGS. 6 and 7 headlamp 110, this half-silvered mirror 360 is shown to be centrally apertured at 378 to expose the projection lens 326 of the projector-type light source assembly 314.

The headlamp 310 is akin to the foregoing embodiments in the other details of construction.

Operation of Fourth Form

The bulbs 374 of the pair of outline expansion light source assemblies 372 may be lit up together with the bulb 322 of the projector-type light source assembly 314 during night driving. The light rays direct from the bulbs 374, as well as those reflected by the reflectors 376, will then be thrown forwardly through the half-silvered mirror 360, as indicated at R in FIG. 11, together with the light rays R emitted by the projector-type light source assembly 314. The complete space within the front lens 321 of the lamp housing 312 will then appear glowing. In the daytime, on the other hand, the half-silvered mirror 360 will reflect the daylight, so that the lamp housing 312 will appear thoroughly glowing.

Although the lighting device of this invention has been shown and described as adapted for use as vehicle headlamps, it is understood that the invention itself finds other applications within the broad teaching hereof. It is also recognized that various changes may be made in the form, details, arrangements and proportions of the parts of the above disclosed headlamps without departing from the scope of the invention.

What is claimed is:

1. A projector-type lighting device of expanded outline appearance suitable for use as a headlamp or the like on a motor vehicle or the like, comprising:
   (a) a lamp housing of desired shape and size;
   (b) projector-type light source means mounted to the lamp housing approximately in a central position thereon and at least partly received therein, the projector-type light source means comprising:
      (1) a light source;
      (2) a reflector for reflecting and converging the light emitted by the light source;
      (3) a projection lens disposed opposite the light source and having a focus at a point intermediate the projection lens and the light source for projecting a beam of light through the lamp housing; and
      (4) the projector-type light source means being so small in comparison with the lamp housing that an annular space is left around the light source means within the lamp housing; and
   (c) outline expansion means for enlarging the apparent size of the light source, said expansion means being disposed in the annular space between the projector-type light source means and the lamp housing, the outline expansion means being self-illuminating so as to glow when the projector-type light source means is glowing.

2. A projector-type lighting device of expanded outline appearance suitable for use as a headlamp or the like on a motor vehicle or the like, comprising:
   (a) a lamp housing of desired shape and size;
   (b) projector-type light source means mounted to the lamp housing approximately in a central position thereon and at least partly received therein, the projector-type light source means comprising:
      (1) a light source;
      (2) a reflector for reflecting and converging the light emitted by the light source;
      (3) a projection lens disposed opposite the light source and having a focus at a point intermediate the projection lens and the light source for projecting a beam of light through the lamp housing; and
      (4) the projector-type light source means being so small in comparison with the lamp housing that an annular space is left around the light source means within the lamp housing; and
   (c) outline expansion means disposed in the annular space between the projector-type light source means and the lamp housing, the outline expansion means being capable of self-illumination, said outline expansion means comprising:
      (1) an outline expander plate of transparent material mounted to the lamp housing and centrally apertured for the passage of the light beam emitted by the projector-type light source means;
      (2) outline expansion light source means positioned opposite the periphery of the outline expander plate, the outline expander plate being capable of transmitting therethrough by internal reflection the light incident edgewise thereon from the outline expansion light source means; and
      (3) reflector means formed on one face of the outline expander plate for reflecting the light from the outline expansion light source means forwardly of the lighting device through the lamp housing;
   (d) whereby the lighting device appears larger in size when the outline expansion means is glowing than when only the projector-type light source means is glowing.

3. The lighting device of claim 2 wherein the reflector means of the outline expansion means comprises a multiplicity of conical cavities in the outline expander plate.

4. The lighting device of claim 3 further comprising a diffuser plate disposed within the lamp housing for the uniformity of the intensity of the light reflected by the reflector means of the outline expansion means.

5. The lighting device of claim 2 wherein the outline expander plate is formed to have a pair of opposite edges and wherein the outline expansion light source means comprises a pair of light bulbs disposed opposite the pair of opposite edges of the outline expander plate.

6. The lighting device of claim 2 further comprising a half-silvered mirror disposed within the lamp housing for reflecting external light while transmitting the light from the projector-type light source means and from the outline expansion means.

7. A projector-type lighting device of expanded outline appearance suitable for use as a headlamp or the like on a motor vehicle or the like, comprising:
   (a) a lamp housing of desired shape and size;
   (b) projector-type light source means mounted to the lamp housing approximately in a central position thereon and at least partly received therein, the projector-type light source means comprising:
      (1) a light source;
      (2) a reflector for reflecting and converging the light emitted by the light source;
      (3) a projection lens disposed opposite the light source and having a focus at a point intermediate the projection lens and the light source for projecting a beam of light through the lamp housing; and
      (4) the projector-type light source means being so small in comparison with the lamp housing that an annular space is left around the light source means within the lamp housing; and
   (c) outline expansion means disposed in the annular space between the projector-type light source means and the lamp housing, the outline expansion means being capable of self-illumination;
   (d) a filter plate disposed within the lamp housing for filtering the light emitted by the projector-type light source means and the outline expansion light source means;
   (e) whereby the lighting device appears larger in size when the outline expansion means is glowing than when only the projector-type light source means is glowing.

8. A projector-type lighting device of expanded outline appearance suitable for use as a headlamp or the like on a motor vehicle or the like, comprising:
   (a) a lamp housing of desired shape and size;
   (b) projector-type light source means mounted to the lamp housing approximately in a central position thereon and at least partly received therein, the projector-type light source means comprising:
      (1) a light source;
      (2) a reflector for reflecting and converging the light emitted by the light source;

(3) a projection lens disposed opposite the light source and having a focus at a point intermediate the projection lens and the light source for projecting a beam of light through the lamp housing; and (4) the projector-type light source means being so small in comparison with the lamp housing that an annular space is left around the light source means within the lamp housing; and (c) outline expansion means disposed in the annular space between the projector-typed light source means and the lamp housing, the outline expansion means being capable of self-illumination, the outline expansion means comprising:

(1) outline expansion light source means mounted to the lamp housing; and (2) a half-silvered mirror positioned opposite the outline expansion light source means for transmitting the light therefrom while reflecting external light;

(d) whereby the lighting device appears larger in size when the outline expansion means is glowing than when only the projector-type light source means is glowing.

9. The lighting device of claim 8 further comprising a half-silvered mirror disposed within the lamp housing for reflecting external light while transmitting the light from the projector-type light source means and from the outline expansion means.

10. A projector-type lighting device of expanded outline appearance suitable for use as a headlamp or the like on a motor vehicle or the like, comprising:

(a) a lamp housing of desired shape and size;

(b) projector-type light source means mounted to the lamp housing approximately in a central position thereon and at least partly received therein, the projector-type light source means comprising:

(1) a light source;

(2) a reflector for reflecting and converging the light emitted by the light source;

(3) a projection lens disposed opposite the light source and having a focus at a point intermediate the projection lens and the light source for projecting a beam of light through the lamp housing; and (4) the projector-type light source means being so small in comparison with the lamp housing that an annular space is left around the light source means within the lamp housing; and (c) outline expansion means disposed in the annular space between the projector-type light source means and the lamp housing, the outline expansion means being capable of self-illumination, the outline expansion means comprising:

(1) an outline expander plate of transparent material mounted to the lamp housing;

(2) there being an aperture defined approximately centrally in the outline expander plate for receiving the projection lens of the projector-type light source means, the outline expander plate being capable of transmitting therethrough by internal reflection the light incident edgewise thereon from the projection lens; and (3) reflector means formed on one face of the outline expander plate for reflecting the light from the projection lens of the projector-type light source means forwardly of the lighting device through the lamp housing;

(d) whereby the lighting device appears larger in size when the outline expansion means is glowing than when only the projector-type light source means is glowing.

11. The lighting device of claim 10 wherein the outline expansion light source means comprises a pair of outline expansion light source assemblies mounted on the opposite sides of the projector-type light source means.

12. The lighting device of claim 11 wherein each outline expansion light source assembly comprises:

(a) an outline expansion light bulb; and (b) a generally concave reflector having the outline expansion light bulb mounted centrally thereto for reflecting the light therefrom generally in the forward direction of the lighting device through the half-silvered mirror and the lamp housing.

13. The lighting device of claim 10 wherein the half-silvered mirror is centrally apertured to expose the projection lens of the projector-type light source means.

14. A projector-type lighting device of expanded outline appearance suitable for use as a vehicle headlamp, comprising:

(a) a lamp housing of desired shape and size;

(b) projector-type light source means mounted to the lamp housing approximately in a central position thereon and at least partly received therein, the projector-type light source means comprising:

(1) a first light source;

(2) a second light source, displaced from the first light source, for providing light of less intensity than that of the first light source, the first and second light sources being selectively switched on;

(3) a reflector for reflecting and converging the light emitted by the first and second light sources;

(4) a projection lens disposed opposite the reflector and having a focus at a point intermediate the projection lens and the light source for projecting a beam of light through the lamp housing;

(5) a shield screen disposed intermediate the reflector and the projection lens for shielding part of the light from the first light source, the shield screen permitting the passage of substantially all of the light from the second light source; and (6) the projector-type light source means being so small in comparison with the lamp housing that an annular space is left around the light source means within the lamp housing; and (c) self-illuminating outline expansion means disposed in the annular space between the lamp housing and the projector-type light source means in order to make the lighting device appear larger in size, the outline expansion means comprising:

(1) an outline expander plate of transparent material mounted to the lamp housing;

(2) there being an aperture defined approximately centrally in the outline expander plate for receiving the projection lens of the projector-type light source means, the outline expander plate being capable of transmitting therethrough by internal reflection the light incident edgewise thereon from the projection lens; and (3) reflector means formed on one face of the outline expander plate for reflecting the light from the projection lens of the projector-type light source means forwardly of the lighting device through the lamp housing.

15. The lighting device of claim 14 further comprising a half-silvered mirror disposed within the lamp housing for reflecting external light while transmitting the light from the projector-type light source means and from the outline expansion means.

* * * * *